Figure 1:
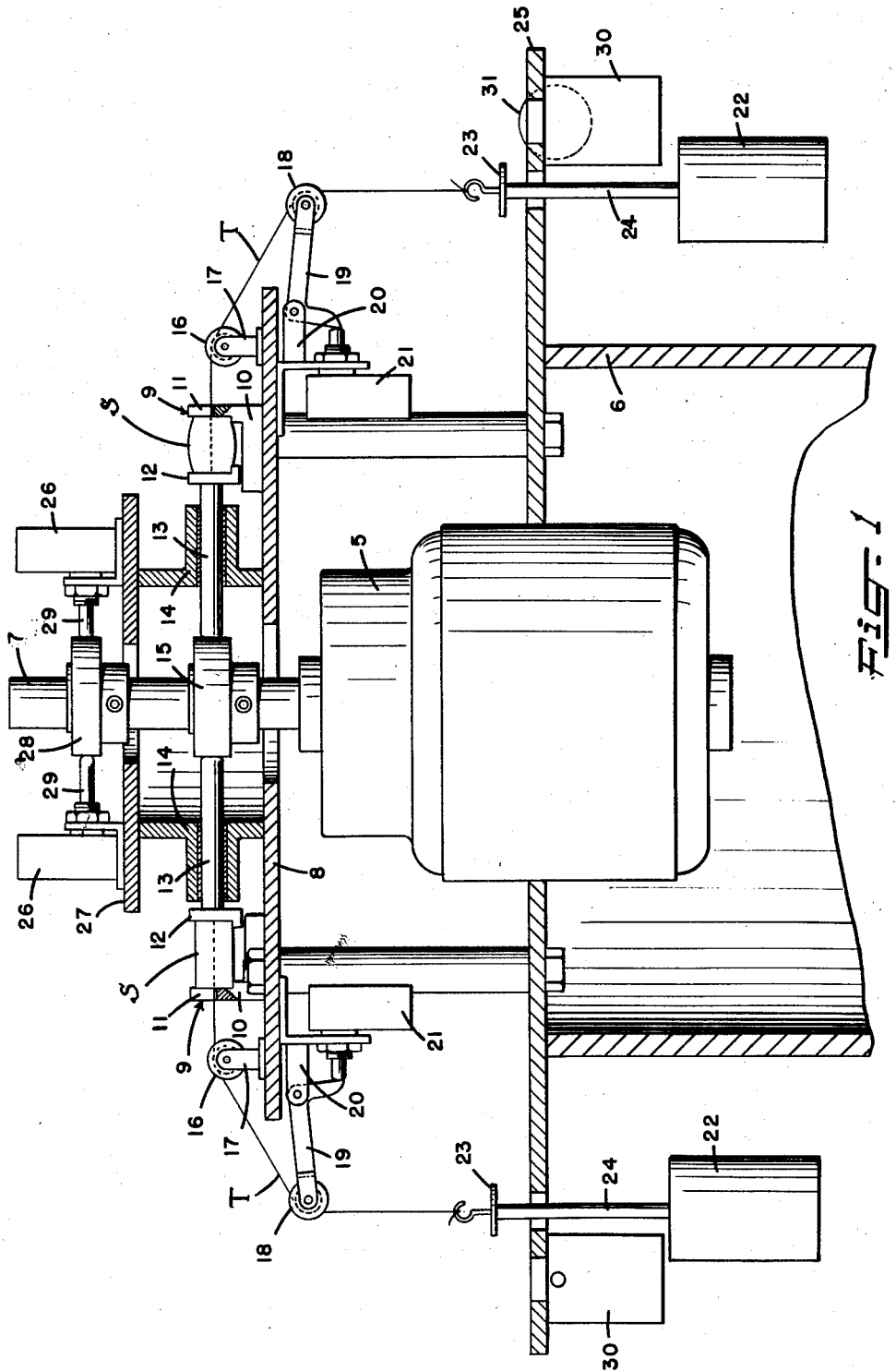

Dec. 15, 1959     E. C. GIBSON     2,916,912

TIRE CORD TESTING MACHINE

Filed Oct. 13, 1955     3 Sheets-Sheet 1

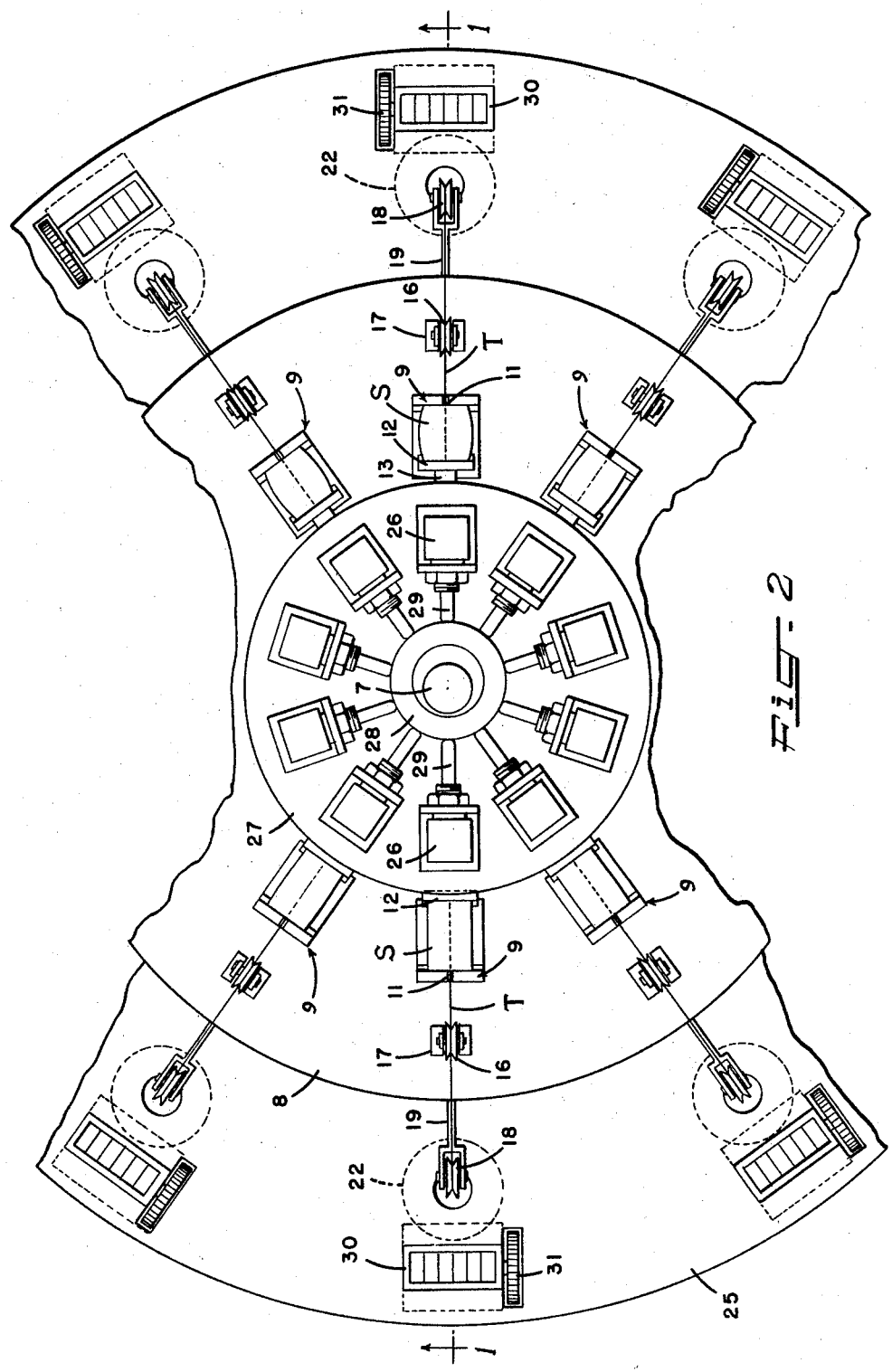

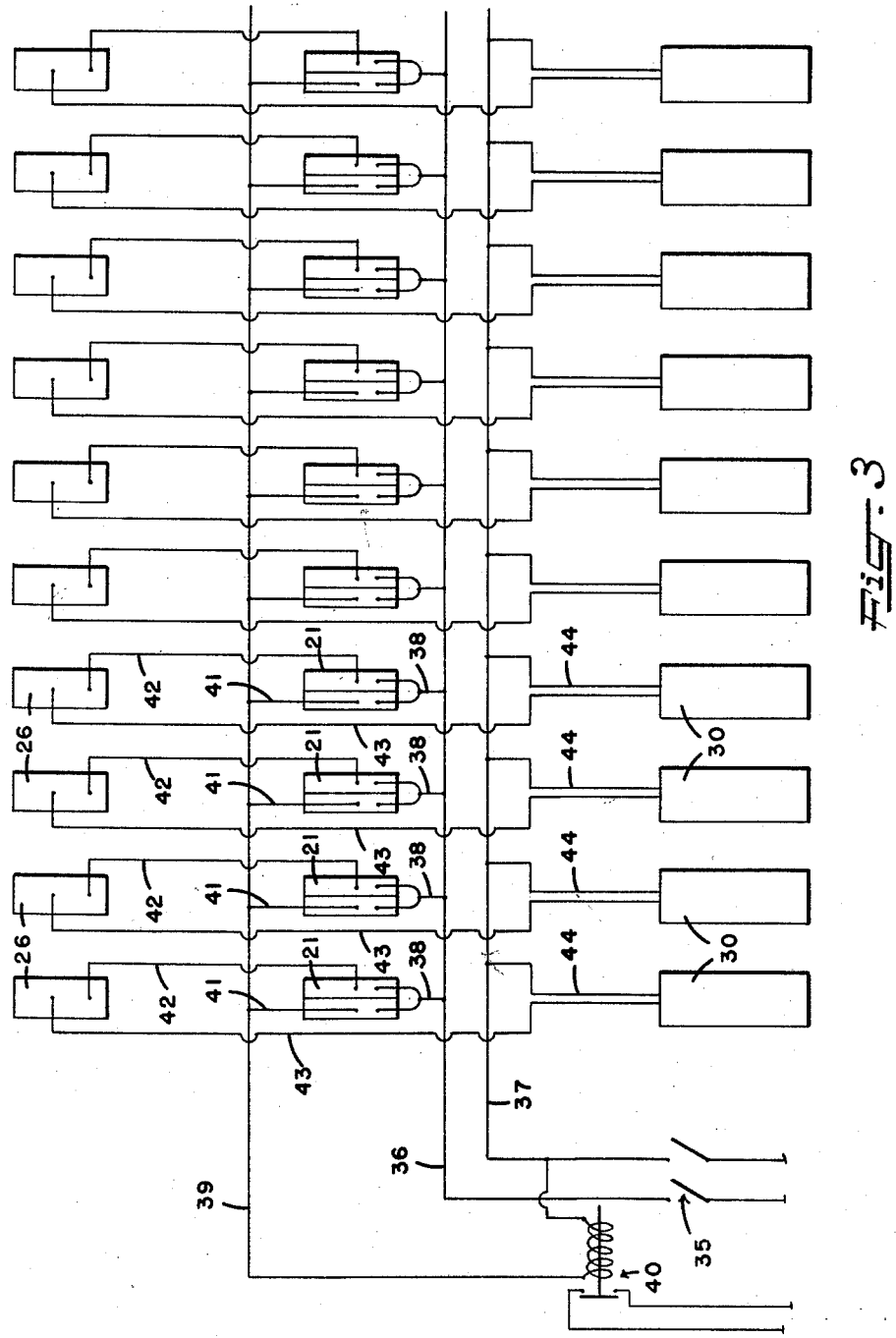

United States Patent Office 2,916,912
Patented Dec. 15, 1959

2,916,912

TIRE CORD TESTING MACHINE

Eugene C. Gibson, Bon Air, Pa., assignor to American Viscose Corporation, Philadelphia, Pa., a corporation of Delaware Application October 13, 1955, Serial No. 540,257

8 Claims. (Cl. 73—91)

This invention relates to testing machines and more particularly to an improved multi-strand tire cord testing machine.

The ability of cord used in vehicle tires to withstand repeated flexing is one of the chief requirements in the production and use of this product. With modern relatively low pressure tires there is a flexing of the cord every time the wheel rotates. In addition there are compound strains and flexing actions caused by road surface irregularities. Heretofore no laboratory apparatus has been produced which closely approximates the high speed flexing conditions to which modern vehicle tires are subjected. The present apparatus provides a simple testing machine which simultaneously flexes a plurality of tire cord strands and which can individually count the number of flexes imposed on each strand for the duration of the test. The machine is capable of testing not only the strength of the cord or strand itself, but also the bond with which the cord is secured or vulcanized in the rubber sample.

The primary object of the invention therefore is to provide an improved high speed flex testing apparatus for textile strands and their bond to tire material.

A further object of the invention is to provide a high speed flex testing apparatus for textile strands in which the impulses or loads imparted to each strand are automatically counted.

A still further object of the invention is to provide a tire cord testing apparatus which simultaneously tests a plurality of samples and which automatically stops when the last sample fails.

Further objects will be apparent from the specification and drawings in which

Fig. 1 is a sectional elevation view of a tire cord testing machine constructed in accordance with the invention as seen at 1—1 of Fig. 2, Fig. 2 is a top view of the apparatus of Fig. 1, and Fig. 3 is a wiring diagram for the testing machine.

The invention comprises essentially the provision of an electric motor and gear reducer mounted in a stand with its shaft in a vertical position. A cam on the shaft actuates a plurality of cam followers which sequentially compress a series of rubber test samples in which a tire cord has been imbedded. The number of compressions imparted to each sample is automatically registered on a counter so that when the bond between a tire cord and the test sample fails, the total number of impulses is automatically registered. Each tire cord sample is weighted and carried over a spring loaded lever arm which holds a switch closed. With the opening of the switch, the counter for its associated sample ceases to register even though other samples may still be undergoing test. The switches are also interconnected so that when the last test sample gives way, the circuit to the motor is automatically opened.

Referring now more particularly to the drawings, a main motor 5 is mounted on a framework 6 with its shaft 7 in a vertically extended position. A platform 8 is supported on framework 6 and carries a plurality of test stations 9, 9, each of which comprises a fixed jaw 10 slotted at 11 and an oscillating jaw or ram 12 secured to a cam follower 13 which is journaled in a bearing 14. Shaft 7 is provided with a lower ball bearing cam 15 for actuating each of the cam followers 13 so that samples S are alternately compressed and relieved at relatively high speeds. Each sample S consists of a cylindrical piece of rubber in which a strand or length of tire cord T is vulcanized or otherwise bonded. When in test position, the sample is placed between jaws 10 and 12 with the cord leading out through slot 11 and passing over a stationary pulley 16 supported on platform 8 by pedestals 17. Each cord T is then carried over a pulley 18 mounted on the end of bell crank 19 journaled in bracket 20. A normally open switch 21 is held closed when the bell crank 19 is retained in its down position by the cord T. A suitable weight 22 is secured to the end of cord T in such a manner that when the cord breaks or becomes disengaged from sample S, a flange 23 on the weight shaft 24 engages an upper plate 25 of support 6 to thus prevent the weight from dropping on the floor.

It will be understood that the apparatus comprises a plurality of testing stations as shown in Fig. 2 and that the present machine preferably embodies provisions for testing ten samples simultaneously.

A series of switches 26, 26 is mounted on an upper platform 27 in such a way that each switch is actuated for every turn of a ball bearing cam 28 through cam followers 29. The cams 28 and 15 are so shaped and adjusted that each switch 26 is closed when the associated sample S is compressed. Counters 30, 30 are actuated electrically, rather than mechanically, by the switches 26 so that when the bond in any sample S fails or when the strand T ruptures, the counter for that particular sample automatically stops. The counters 30, 30 are provided with suitable thumb wheels 31, 31 so that they may be manually reset whenever a new test is begun.

Fig. 3 shows the wiring diagram for the counter and its interconnection with the motor 5. Current from a main source of supply is furnished through switch 35 to electrical leads 36 and 37. The single-throw double-pole switches 21, 21 have two poles connected to lead 36 through lead 38. One opposite pole of each switch is connected to an electrical lead 39 and to a relay 40 for the motor 5 through leads 41, 41. It will thus be apparent that when any switch 21 is closed relay 40 is energized to keep motor 5 running, but when the last sample fails, all circuits to the relay are opened, thus stopping the machine. The cam-actuated switches 26, 26 connect to the other opposite pole of switches 21 through electrical leads 42, 42 and to the counters 30, 30 through electrical leads 43, 43. The other electrical counter leads 44, 44 are connected directly to the main line 37 so that whenever one of the switches 26 is closed, its associated counter 30 is energized to indicate that a compression of the sample has taken place. This electrical system is capable of extremely high speed and permits a plurality of samples to be tested simultaneously to obtain accurate and dependable results for each individual sample. The machine is also automatic, since the failure of the last sample opens the switch to the main motor and therefore the operator can take his readings at any time that may be desired.

While preferred embodiments of the invention have been shown and described, it is to be understood that changes and variations may be made without departing from the spirit and scope of the invention as defined in the appended claims.

Having thus described my invention, I claim:

1. A flex testing apparatus comprising a framework, a motor mounted on said framework, a shaft driven by said motor, a cam on said shaft, a plurality of radially arranged fixed sample holders, a normally open switch positioned adjacent to each of the holders, means engageable with the samples for holding said switches closed when portions of the samples are subjected to a predetermined load, a plurality of radially arranged reciprocable rams for compressing the samples in the sample holders when actuated by said cam, and electrical connections between each of said switches and the motor for opening the circuit to the motor when the last of said switches is opened by release of the load on the sample associated therewith.

2. Apparatus for testing the bond between a plurality of cords and samples of rubber-like resilient material comprising a framework, a motor mounted on said framework, a shaft driven by said motor, a cam on said shaft, a plurality of radially arranged fixed holders for the resilient samples, walls defining a slot in each of said holders through which the individual cords pass, means including a weight attached to each cord for applying a predetermined load to the bond between each cord and its sample, a normally open switch positioned adjacent to each of the holders, means engageable with the cords for holding said switches closed when the cords are subjected to the predetermined loads, a plurality of radially arranged reciprocable rams for compressing the samples in the sample holders when actuated by said cam, and electrical connections between each of said switches and the motor for opening the circuit to the motor when the last of said switches is opened by release of the load on the cord holding said switch closed.

3. Apparatus for testing the bond between a cord and a sample of rubber-like resilient material comprising a framework, a motor mounted on said framework, a shaft driven by said motor, a fixed holder for the sample, walls defining a slot in said holder through which the cord passes, means including a weight attached to the cord for applying a predetermined load to the bond between the cord and the sample, a reciprocable ram for compressing the sample in the sample holder, means including a cam on said shaft for actuating said ram, a normally open switch adjacent to said holder, means engageable with the cord for holding said switch closed when the cord is subjected to said predetermined load, and electrical connections between said switch and the motor for opening the circuit to the motor when said switch is opened by a release of the load on the cord holding said switch closed.

4. Apparatus for testing the bond between a plurality of cords and samples of rubber-like resilient material comprising a framework, a motor mounted on said framework, a shaft driven by said motor, a pair of cams on said shaft, a plurality of radially arranged fixed holders for the resilient samples, walls defining a slot in each of said holders through which the individual cords pass, means including a weight attached to each cord for applying a predetermined load to the bond between each cord and its sample, a normally opened switch positioned adjacent to each of the holders, means engageable with the cords for holding said switches closed when the cords are subjected to the predetermined loads, a plurality of radially arranged reciprocable rams for compressing the samples in the sample holders when actuated by one of said cams, electrical connections between each of said switches and the motor for opening the circuit to the motor when the last of said switches is opened by release of the load on the cord holding said switch closed, a plurality of radially arranged switches operatively associated with the other of said cams, an electrical counter for each of said holders, and electrical connections between the said first and last mentioned switches and said counters for actuating the counters in accordance with operation of each ram whereby opening of said first-mentioned switches by failure of the samples associated therewith render said last-mentioned switches and the respective counters inoperative.

5. Apparatus in accordance with claim 4 in which the normally open switches are double-pole switches.

6. A flex testing apparatus comprising a framework, a motor mounted on said framework, a shaft driven by said motor, a pair of cams on said shaft, a plurality of radially arranged fixed sample holders, a plurality of radially arranged reciprocable rams for compressing a sample in said sample holders when actuated by one of said cams, an electrically actuated counter for each of said sample holders, a first electrical switch for each of said counters, means for sequentially closing said switches in accordance with the position of the other cam, a second switch adjacent each of said sample holders, means engageable with portions of the samples for holding each of said second switches closed until failure of a test sample, and electrical connections between the first and second switches for each sample holder for rendering the counter operative when the first switch is closed, and for opening the circuit to the counters when the test sample fails.

7. Apparatus for testing the bond between a cord and a sample material comprising a framework, a holder for the sample material mounted on said framework, means for applying a predetermined load to the bond between the cord and sample material, a normally open switch adjacent to said holder, means cooperating with the cord for holding said switch closed when the predetermined load is applied to the bond between the cord and the sample material, means including a motor for repeatedly compressing the sample material, and electrical connections between said switch and the motor for opening the circuit to the motor when said switch is opened by release of the predetermined load on the bond between the cord and the sample material.

8. Apparatus for testing the bond between a strand and sample material comprising a framework, a holder for the sample material mounted on said framework, means for applying a predetermined load to the bond between the strand and sample material, a first switch adjacent to said holder, means cooperating with the strand for holding said switch closed when the predetermined load is applied to the bond between the strand and the sample material, means including a motor for repeatedly compressing the sample material, a second switch operatively associated with said last-mentioned means, a counter electrically connected with said second switch for indicating the number of compressions to which the sample is subjected, and electrical connections between said first and second switches for rendering said second switch and counter inoperative when said first switch is opened upon failure of the bond between the strand and sample material.

References Cited in the file of this patent

UNITED STATES PATENTS

| | | |
|---|---|---|
| 2,157,092 | Allen et al. | May 9, 1939 |
| 2,557,449 | Melville | June 19, 1951 |
| 2,612,041 | Goodfriend | Sept. 30, 1952 |
| 2,706,907 | Cox | Apr. 26, 1955 |
| 2,760,370 | Linhorst | Aug. 28, 1956 |